US009274592B2

(12) United States Patent
Jahagirdar et al.

(10) Patent No.: US 9,274,592 B2
(45) Date of Patent: *Mar. 1, 2016

(54) TECHNIQUE FOR PRESERVING CACHED INFORMATION DURING A LOW POWER MODE

(71) Applicant: INTEL CORPORATION, Santa Clara, CA (US)

(72) Inventors: Sanjeev Jahagirdar, Folsom, CA (US); Varghese George, Folsom, CA (US); Jose Allarey, Davis, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/141,926

(22) Filed: Dec. 27, 2013

(65) Prior Publication Data

US 2014/0115369 A1   Apr. 24, 2014

Related U.S. Application Data

(63) Continuation of application No. 13/787,311, filed on Mar. 6, 2013, now Pat. No. 8,732,399, which is a continuation of application No. 11/880,357, filed on Jul. 20, 2007, now Pat. No. 8,527,709.

(51) Int. Cl.
*G06F 12/00* (2006.01)
*G06F 13/00* (2006.01)
(Continued)

(52) U.S. Cl.
CPC ............ *G06F 1/3287* (2013.01); *G06F 1/3203* (2013.01); *G06F 1/3275* (2013.01); *G06F 12/084* (2013.01); *Y02B 60/1225* (2013.01); *Y02B 60/1228* (2013.01); *Y02B 60/32* (2013.01)

(58) Field of Classification Search
CPC ... G06F 12/084; G06F 1/3203; G06F 1/3275; G06F 1/3287
USPC ......................................................... 711/130
See application file for complete search history.

(56) References Cited

U.S. PATENT DOCUMENTS 5,247,649 A   9/1993   Bandoh
5,632,038 A   5/1997   Fuller
(Continued)

FOREIGN PATENT DOCUMENTS

CN   1618053 A   5/2005
CN   1910538 A   2/2007
(Continued)

OTHER PUBLICATIONS

German Patent and Trademark Office, Office Action mailed Feb. 26, 2014 in German application No. 11 2008 001895.2.
(Continued)

*Primary Examiner* — Sheng-Jen Tsai
(74) *Attorney, Agent, or Firm* — Trop, Pruner & Hu, P.C.

(57) ABSTRACT

A technique to retain cached information during a low power mode, according to at least one embodiment. In one embodiment, information stored in a processor's local cache is saved to a shared cache before the processor is placed into a low power mode, such that other processors may access information from the shared cache instead of causing the low power mode processor to return from the low power mode to service an access to its local cache.

20 Claims, 4 Drawing Sheets

(51) Int. Cl.
    *G06F 13/28*  (2006.01)
    *G06F 1/32*   (2006.01)
    *G06F 12/08*  (2006.01)

(56) References Cited

U.S. PATENT DOCUMENTS

| | | | |
|---|---|---|---|
| 6,052,789 | A | 4/2000 | Lin |
| 6,711,447 | B1 * | 3/2004 | Saeed ............... 700/82 |
| 6,804,632 | B2 * | 10/2004 | Orenstien et al. ............ 702/188 |
| 6,971,034 | B2 | 11/2005 | Samson et al. |
| 6,976,181 | B2 | 12/2005 | Dai et al. |
| 7,111,178 | B2 * | 9/2006 | Rusu et al. ............ 713/300 |
| 7,194,638 | B1 * | 3/2007 | Larky ............ 713/300 |
| 7,461,213 | B2 | 12/2008 | Hass et al. |
| 8,527,709 | B2 * | 9/2013 | Jahagirdar et al. ............ 711/130 |
| 8,732,399 | B2 * | 5/2014 | Jahagirdar et al. ............ 711/130 |
| 2003/0097530 | A1 | 5/2003 | Arimilli et al. |
| 2003/0101362 | A1 | 5/2003 | Dia |
| 2003/0110012 | A1 | 6/2003 | Orenstien et al. |
| 2004/0006716 | A1 * | 1/2004 | Schuckle et al. ............ 713/300 |
| 2004/0039880 | A1 | 2/2004 | Pentkovski |
| 2005/0005073 | A1 * | 1/2005 | Pruvost et al. ............ 711/148 |
| 2006/0053326 | A1 | 3/2006 | Naveh et al. |
| 2006/0095806 | A1 | 5/2006 | Dai |
| 2006/0171244 | A1 * | 8/2006 | Ando ............ 365/233 |
| 2006/0179250 | A1 | 8/2006 | Guthrie et al. |
| 2007/0005900 | A1 | 1/2007 | Horrigan |
| 2007/0005907 | A1 | 1/2007 | Kardach et al. |
| 2007/0150663 | A1 | 6/2007 | Mendelson et al. |
| 2007/0156963 | A1 | 7/2007 | Chen |
| 2007/0156992 | A1 | 7/2007 | Jahagirdar |
| 2007/0157041 | A1 * | 7/2007 | Youngs ............ 713/300 |
| 2008/0082753 | A1 | 4/2008 | Licht |
| 2008/0209133 | A1 | 8/2008 | Ozer |
| 2009/0024799 | A1 | 1/2009 | Jahagirdar et al. |
| 2009/0132764 | A1 | 5/2009 | Moll |
| 2011/0296211 | A1 * | 12/2011 | Ramaraju et al. ............ 713/320 |
| 2013/0179639 | A1 | 7/2013 | Jahagirdar et al. |

FOREIGN PATENT DOCUMENTS

| | | |
|---|---|---|
| WO | 2009/014931 A2 | 1/2009 |
| WO | 2009/014931 A3 | 4/2009 |

OTHER PUBLICATIONS

Great Britian Intellectual Property Office, UK Search and Examination Report mailed Apr. 3, 2012 in UK Patent Application No. 1000648.4

International Search Report and Written Opinion received for PCT Patent Application No. PCT/US2008/069962, mailed on Feb. 10, 2009, 11 pages.

International Preliminary Report on Patentability received for PCT Patent Application No. PCT/US2008/069962, mailed on Feb. 4, 2010, 6 pages.

Office Action received for Chinese Patent Application No. 200810137747.6, mailed on Jan. 12, 2011, 25 pages of Chinese Office Action including 15 pages of English Translation.

Office Action received for Chinese Patent Application No. 200810137747.6, mailed on Feb. 5, 2010, 19 pages of Chinese Office Action including 10 pages of English Translation.

Office Action received for Korean Patent Application No. 2010-7001251, mailed on Apr. 18, 2011, 3 pages of English Translation.

Office Action received for Chinese Patent Application No. 200810137747.6, mailed on Jun. 29, 2011, 9 pages of Chinese Office Action including 4 pages of English Translation.

Office Action received for United Kingdom Patent Application No. GB1000648.4, mailed on Jul. 1, 2011, 6 pages.

Office Action received for Taiwan Patent Application No. 097124713, mailed on Aug. 11, 2011, 17 pages of Taiwan Office Action including 9 pages of English Translation.

Chinese Patent Office, Office Action mailed Feb. 27, 2015, in Chinese Patent Application No. 201310108148.2.

State Intellectual Property Office of the People's Republic of China, Second Office Action mailed Nov. 4, 2015 in Chinese Patent Application No. 2013101081482.

* cited by examiner

TECHNIQUE FOR PRESERVING CACHED INFORMATION DURING A LOW POWER MODE

This application is a continuation of U.S. patent application Ser. No. 13/787,311, filed Mar. 6, 2013, which is a continuation of U.S. patent application Ser. No. 11/880,357, filed Jul. 20, 2007, now U.S. Pat. No. 8,527,709, issued Sep. 3, 2013, the content of which is hereby incorporated by reference.

TECHNICAL FIELD

Embodiments of the invention relate generally to the field of information processing and more specifically, to the field of power management in computing systems and microprocessors.

BACKGROUND

Some microprocessors and/or processor cores (referred to generically herein as "processors") may include or otherwise have access to a primary cache memory, such as a level one ("L1") cache, or other memory structure from which the processor may retrieve frequently accessed information, such as data or instructions, relatively quickly in relation to other memory structures in the processor or computing system. In addition, some processors may include or otherwise have access to a secondary cache memory, such as a level two ("L2") cache memory, or other memory structure from which it may retrieve less frequently accessed information, such as data or instructions, less quickly than from a primary cache memory but faster than from a system memory, such as dynamic random access memory (DRAM), hard-drive memory, etc.

Some computer systems may include processors, each including or otherwise having access to a local cache memory, such as an L1 cache, to store information that is to be primarily used by the processor to which it corresponds. Furthermore, some computer systems may include a shared cache memory, such as an L2 cache, that may be used by more than one processor. In computer systems having shared cache memory, the shared cache memory may store all or some portion of information stored in each of the local cache memories, such that multiple local cache memories store a subset of frequently used information stored in the shared cache memory. Information stored in local cache memories may be updated more frequently than the corresponding information in the shared cache memory, and therefore, the computer system may implement a cache coherency scheme to maintain the same information in the shared cache memory as is stored in one or more local cache memories.

Some computer systems may use power management techniques to place processors in the system in low power modes, via reducing clock frequency and/or voltage to one or more processors in the system, when a particular processor isn't being used or in response to other algorithms, such as those in which temperature of the processor or computer system is monitored and prevented from exceeding a threshold temperature. Processors that are placed in low power modes may retain information stored in their corresponding local cache memory while in the low power mode by, for example, maintaining power to the local cache, such that the information will be available when the processor returns from the low power mode.

One drawback of prior art techniques of retaining cached information during a low power mode is that processors that may access a cache of a processor in a low power mode, via a "snoop" cycle, for example, may have to wait until the processor in the low power mode returns from the low power mode and can respond to the access by the other processor. The latency between the access to the low power mode processor's cache and when the requested data is either retrieved or determined not to exist in the low power mode processor's cache can significantly diminish the performance of the corresponding computer system. The problem may be exacerbated when the number of processors are increased, as the number of processors that may be in a low power mode and the number of accesses to these processors may increase. Furthermore, the computer system may draw unnecessary power, particularly if the requested information is determined not to exist in the local cache of the processor that's in a low power mode.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

At least one technique for retaining cached information during a low power mode within a computer system is disclosed. In the following description, for purposes of explanation, numerous specific details are set forth in order to provide a thorough understanding of embodiments of the present invention. It will be apparent, however, to one skilled in the art that embodiments of the present invention can be practiced without these specific details.

In general, embodiments described herein may be applied to any number of multi-processor systems that include multiple microprocessors, a single microprocessor having multiple processor cores, or multiple processors each having multiple processor cores. For simplicity, microprocessors and microprocessor cores will be generically referred to herein as "processors". Furthermore, primary caches (i.e., those used to store most frequently used information by a processor) will be referred to generically herein as "local caches", whereas secondary caches (i.e., those used to store less frequently used information than a local cache, such as L2 caches, L3 caches, etc.) that are used to store at least some information stored in the primary caches of two or more processors shall be referred to generically herein as "shared caches". Finally, voltage and/or frequency states, in which a processor may operate, including those in which one or more processor clocks are idle, stopped, halted, or reduced below a maximum operating frequency and/or one or more processor voltages are reduced below a maximum operating voltage, may be generically referred to herein as "power modes".

In some embodiments, a processor may save information stored in its local cache to corresponding locations within a shared cache before being placed into a low power mode, such that other processors, which may otherwise attempt to access information from the low power mode processor's local cache may instead retrieve the required information from the shared cache, and the low power mode processor may remain in a low power mode until it's otherwise needed. Advantageously, at least one embodiment may improve performance in a computer system, because instead of the system waiting for a processor in a low power state to return from the low power state to service an access to its local cache by another processor, the information may instead be retrieved from the shared cache to which the low power mode processor saved the information before entering the low power state. In some embodiments, an access to the shared cache may be serviced faster than an access to a local cache of a processor in a low power mode. Furthermore, because a processor in a low power mode may not need to return from the low power mode to service an access to its local cache, at least one embodiment may help conserve power in a system in which the at least one embodiment is used.

In one embodiment, a processor to be placed in a low power mode may first perform a cache flush operation, cache invalidate operation, writeback operation or other operation that causes the information stored in the processor's local cache to be saved to a shared cache. In one embodiment, the low power mode may include turning off one or more clocks to the processor to be placed in the low power mode. In other embodiments, the low power mode may include reducing or removing one or more operating voltages used to power the processor, the local cache, or both. In still other embodiments, a low power mode may reduce or completely disable both frequency and voltage to a processor.

Figure 1:
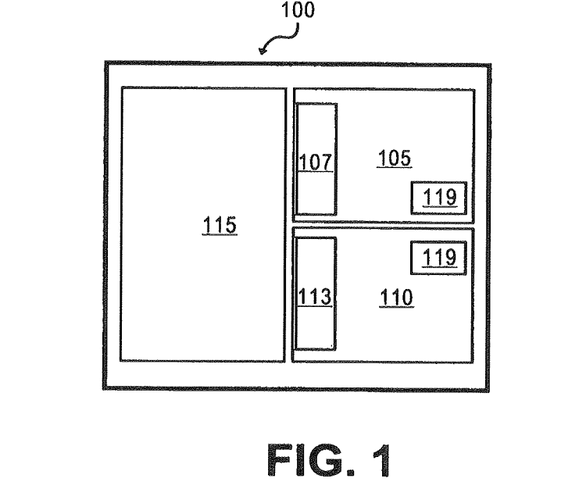
FIG. 1 illustrates a block diagram of a multi-core microprocessor, in which at least one embodiment of the invention may be used.

FIG. 1 illustrates a multi-core microprocessor in which at least one embodiment of the invention may be used. In particular, FIG. 1 illustrates microprocessor 100 having at least two processor cores 105 and 110, each having associated therewith a local cache 107 and 113, respectively. Also illustrated in FIG. 1 is a shared cache memory 115 which may store versions of at least some of the information stored in each of the local caches 107 and 113. In some embodiments, microprocessor 100 may also include other logic not shown in FIG. 1, such as an integrated memory controller, integrated graphics controller, as well as other logic to perform other functions within a computer system, such as I/O control. In one embodiment, each microprocessor in a multi-processor system or each processor core in a multi-core processor may include or otherwise be associated with logic 119 to direct an access to either a local cache or a shared cache, depending upon the power state of the processor/core at any given time. The logic may include or be associated with a memory, such as a non-volatile programmable memory, to store the power state of the core or processor at any time during the operation of the computer system. In such an embodiment, accesses to a processor or core are made without regard to the power state of the target processor or core, such that the same type of access, such as a snoop, may be sent to each processor or core and the target processor or core may either service the snoop to its local cache or redirect the snoop into an access (snoop or other operation) to the shared cache, depending on the power state of the processor or core.

In one embodiment, one of the processor cores illustrated in FIG. 1 may store a most recent version of information stored in its local cache to the shared cache before entering a low power mode. When one of the cores is in a low power mode ("the low power mode core"), the other core (or cores) may obtain the most recent version of information stored in the low power mode core's local cache by accessing the shared cache, since the low power mode core had saved the most recent information from its local cache to the shared cache before it went into the low power mode. In one embodiment, the low power mode core may have performed a cache flush operation, in which some or all of the information stored in the low power mode core's local cache is saved to the shared cache before some or all of the local cached information is invalidated or the low power mode core enters the low power mode. In other embodiments, other operations may be performed to save some or all of the information of the low power mode core's local cache to the shared cache, depending on the instruction set architecture of the core.

In one embodiment, a processor may, at anytime, be in one of a number of different power states, including one or more low power modes. For example, a processor may be in a fully powered component state ("C0"), in which a maximum allowable amount of power is consumed, a reduced power component state ("C1"), defined by a lower allowable power consumption than the C0 state, or other low power states (e.g., C3, C6, etc.), each being defined by progressively lower allowable power consumption. Moreover, one or more of a processor's clocks or power supplies may be adjusted to accomplish the allowable power consumption associated with each state.

For example, in one embodiment, a fully powered C0 state may be achieved by operating one or more processor clocks within a range of frequencies and operating one or more power supplies to the processor within a range of voltages so as to maximize performance of the processor. Such a power state may be useful, for example, when a large performance demand is placed on the processor by a program running on the processor. A reduced power state, C1, may be accomplished by putting the processor into an idle, halt, or other low performance state by stopping or reducing one or more processor clocks while maintaining one or more power supplies to the processor within a range of voltages. In such a reduced power state, the processor may be able to draw less power than in the C0 state, but yet still service accesses to its local cache from other processors, vis-a-vis a snoop operation, for example.

In one embodiment, a processor, such as one of the cores illustrated in FIG. 1, may be placed into a lower power state than C0 or C1 by stopping or reducing one or more clocks to the processor and removing or reducing the voltage of one or more power supplies supplied to the processor, such that information stored in the processor's local cache would not be retained. In FIG. 1, for example, one of the cores may be placed into a low power core component state ("CC3" state), in which all clocks to the core are halted and all power supply voltages are removed or otherwise lowered to a non-active level. In a CC3 state, according to one embodiment, a core may draw a minimal amount of power, and possibly none at all. Therefore, before a processor, or a core illustrated in FIG. 1, can be placed into a CC3 state, at least any modified information stored in the core's local cache may be stored to the corresponding location in the shared cache. In one embodiment, only modified information (i.e., versions of information in the local cache that are more recent than versions of the same information stored in the shared cache) is stored to the shared cache before the core enters the CC3 state. In other embodiments, the entire contents of the local cache is stored to the shared cache before the core enters the CC3 state, regardless of whether it has been modified from the versions available in the shared cache.

Advantageously, because the shared cache contains at least the modified information stored in the local cache of the core to be placed in a CC3 state, in one embodiment, any other processors, or cores illustrated in FIG. 1, that may otherwise attempt to access the CC3 core's cache, such as when the core to be accessed is in a reduced core component state (e.g., "CC1"), may instead access the requested information directly from the shared cache, leaving the CC3 core in a low power mode, thereby saving power. Furthermore, in one embodiment, since the CC3 core does not have return from its low power state to service an access to its local cache from another core or processor, vis-a-vis a snoop operation, for example, the accessing processor or core may not have to wait as long for the information it requests as it would if it had to wait for the accessed core to return from its low power state to service the request. The techniques described above in various embodiments may be further applied to a system having any number of processors or processor cores.

Figure 2:
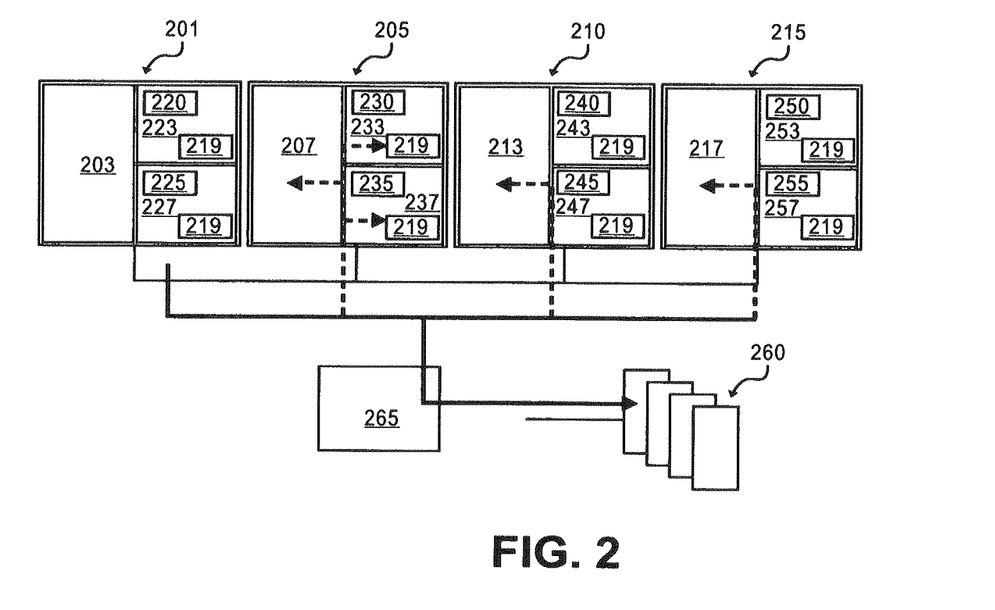
FIG. 2 illustrates a block diagram of a shared bus computer system, in which at least one embodiment of the invention may be used.

FIG. 2, for example, illustrates a front-side-bus (FSB) computer system in which one embodiment of the invention may be used. Any processor 201, 205, 210, or 215 may access information from any local level one (L1) cache memory 220, 225, 230, 235, 240, 245, 250, 255 within or otherwise associated with one of the processor cores 223, 227, 233, 237, 243, 247, 253, 257. Furthermore, any processor 201, 205, 210, or 215 may access information from any one of the shared level two (L2) caches 203, 207, 213, 217 or from system memory 260 via chipset 265. One or more of the processors in FIG. 2 may include or otherwise be associated with logic 219 to direct an access to either a local cache or a shared cache, depending upon the power state of the processor/core at any given time. The logic may include or be associated with a memory, such as a non-volatile programmable memory, to store the power state of the core or processor at any time during the operation of the computer system.

In the example illustrated in FIG. 2, both cores are in an active core component state ("CC0" state) in processor 201, whereas in processor 205, both cores are in a reduced power state, such as CC1, such that each core can service snoops, or similar operations, from active cores 223 and 227. Processors 210 and 215 each have their cores in a lower power mode than the cores of processors 201 and 205, such as a CC3 state, such that the information in local caches 243, 247, 253, and 257 are no longer available. In one embodiment, if active cores 223 or 227 are to access information that was stored in the local caches of the cores of processors 210 and 215, then they will have to obtain the information from the shared caches of processors 210 and 215, respectively. This is because, in one embodiment, the cores of processors 223 and 227 stored at least modified versions of the information stored in their local caches to their respective shared caches 213 and 217 before entering the CC3 state. If the information requested from the cores of processor 201 is not available in the shared caches 213 and 217, nor available in the local caches 230 or 235, then the cores of processor 201 will have to resort to accessing the information from system memory 260 via chipset 265 or via a hard drive or other memory source not shown in FIG. 2.

In some embodiments, the cores of each of the processors of FIG. 2 may be in different power modes from one another rather than in the same power mode as illustrated in FIG. 2. In one embodiment, logic may be included in each of the processors or cores to indicate to a snoop or similar operation whether the core being accessed is in a CC3 state or other state, such that the requesting core may issue the appropriate transaction to address the appropriate memory structure (local cache or shared cache) of the core being accessed. In some embodiments, an indication of core power state may be recorded and tracked in a software program, such as a table accessible by a computer system's BIOS. For example, in one embodiment, whenever a core or processor changes power state, the change is recorded in table stored in logic or memory that a system BIOS can read and inform any cores or processors that may attempt to access another processor's or core's local cache. By informing the accessing processor or core about the power modes of other processors or cores, it can access the appropriate memory structure, such as a shared cache when the corresponding local cache to be accessed is in a reduced power state, such as CC3. In other embodiments, power mode information for each processor or core may be modified and recorded through other means, including hardware logic or other software besides BIOS.

In some embodiments, a processor or core being accessed may include logic to control the accessed processor's/core's response. For example, in one embodiment, each processor (or core) in a computer system that is to use techniques described herein, may include storage, such as a non-volatile programmable memory, that stores the power state of the processor at any given time such that associated logic may determine how to respond to a snoop request, or other similar operation, from another processor/core. In one embodiment, the storage and logic may be used, for example, to cause an access to a processor or core in a CC3 state to be redirected from the processor's or core's local cache to a shared cache or other L2 cache. Whereas if the processor or core being accessed was in another state, such as a CC0 or CC1 state (i.e., a higher power state than CC3), then logic within the accessed processor or core would allow its local cache to be snooped or otherwise accessed. In such an embodiment, the accessing processor core need not be aware of any processor's power state, but may simply issue an access, such as a snoop, to the local cache of any other processor and the accessed processor (or core) may direct the access where it needs to go based on the power state its in at the time.

Figure 3:
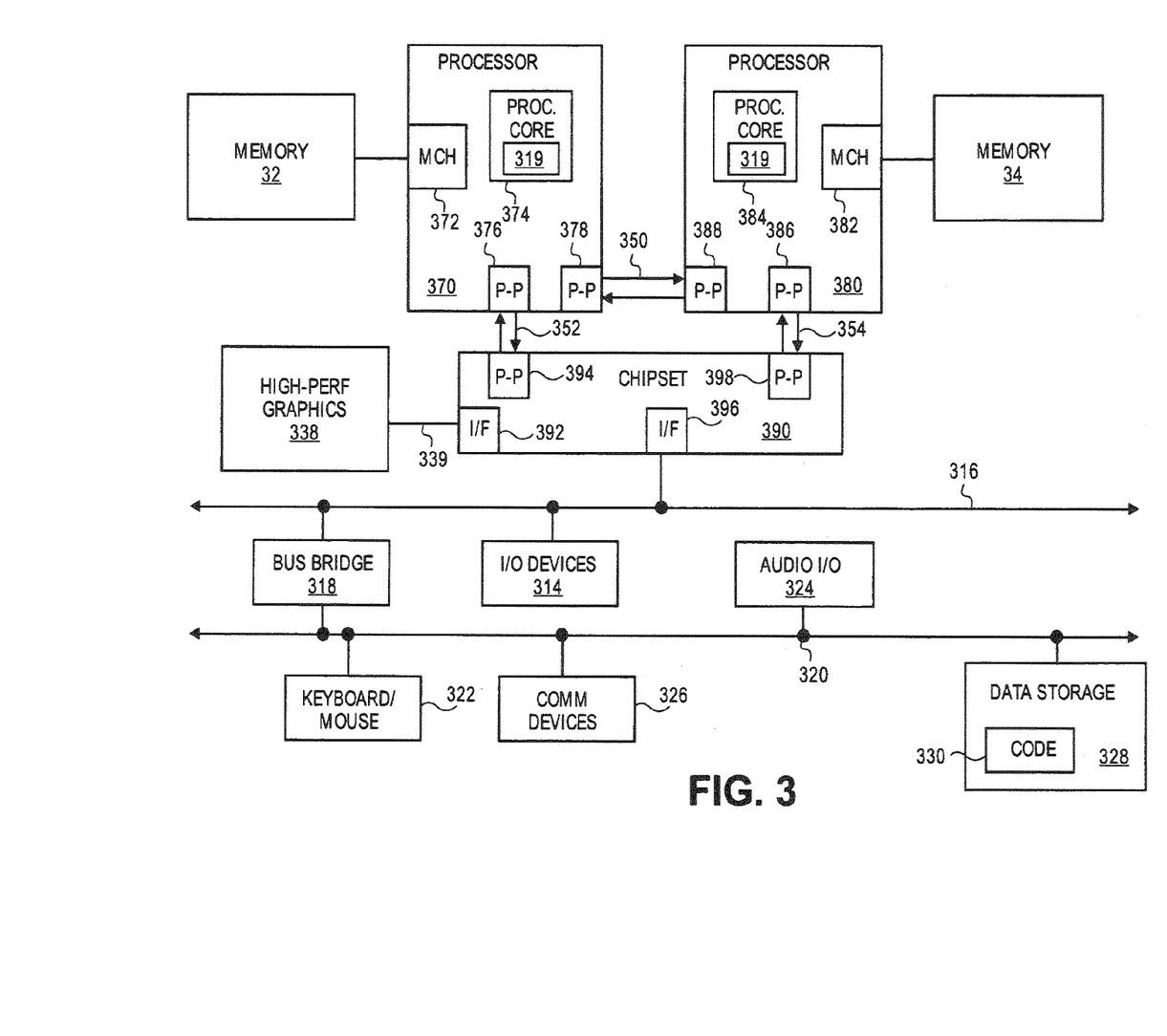
FIG. 3 illustrates a block diagram a point-to-point interconnect computer system, in which at least one embodiment of the invention may be used.

In addition to the FSB computer system illustrated in FIG. 2, other system configurations may be used in conjunction with various embodiments of the invention, including point-to-point (P2P) interconnect systems and ring interconnect systems. The P2P system of FIG. 3, for example, may include several processors, of which only two, processors 370, 380 are shown by example. Processors 370, 380 may each include a local memory controller hub (MCH) 372, 382 to connect with memory 32, 34. Processors 370, 380 may exchange data via a point-to-point (PtP) interface 350 using PtP interface circuits 378, 388. Processors 370, 380 may each exchange data with a chipset 390 via individual PtP interfaces 352, 354 using point to point interface circuits 376, 394, 386, 398. Chipset 390 may also exchange data with a high-performance graphics circuit 338 via a high-performance graphics interface 339. Embodiments of the invention may be located within any processor having any number of processing cores, or within each of the PtP bus agents of FIG. 3. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode. One or more of the processors or cores in FIG. 3 may include or otherwise be associated with logic 319 to direct an access to either a local cache or a shared cache, depending upon the power state of the processor/core at any given time. The logic may include or be associated with a memory, such as a non-volatile programmable memory, to store the power state of the core or processor at any time during the operation of the computer system.

Figure 4:
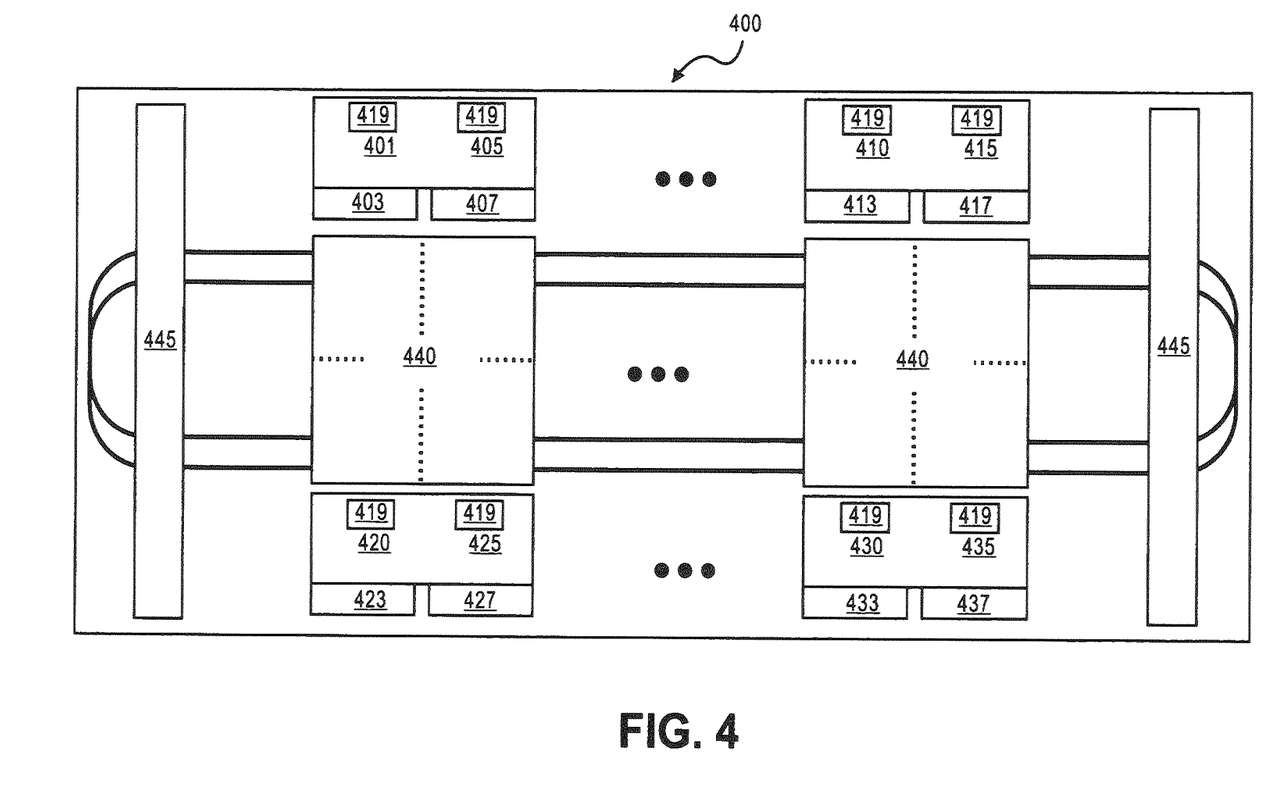
FIG. 4 illustrates a block diagram of a ring-based multi-core microprocessor, in which at least one embodiment of the invention may be used.

FIG. 4 illustrates a computer system or processor organized in ring configuration, in which at least one embodiment may be used. The ring system of FIG. 1 includes eight processors or processor cores 401, 405, 410, 415, 420, 425, 430, 435 organized along a concentric ring interconnect, in which each processor or core has a corresponding local cache which may be accessed by another core along the ring interconnect. The system or processor of FIG. 4 also includes a shared last level cache (LLC) 440, which stores all or some versions of information stored in the local caches 403, 407, 413, 417, 423, 427, 433, 437. In one embodiment if one of the processors or cores in FIG. 4 are in a power mode, in which information is no longer accessible from the processor's or core's local cache, then any other processor or core attempting to access information that was stored in the low power mode processor's/core's local cache, must instead attempt to access this information from the LLC. In one embodiment, if the information is not available in the LLC, then the accessing processor or core may need to access the data from a system memory source (not shown) via memory controller 445. One or more of the processors in FIG. 4 may include or otherwise be associated with logic 419 to direct an access to either a local cache or a shared cache, depending upon the power state of the processor/core at any given time. The logic may include or be associated with a memory, such as a non-volatile programmable memory, to store the power state of the core or processor at any time during the operation of the computer system.

Figure 5:
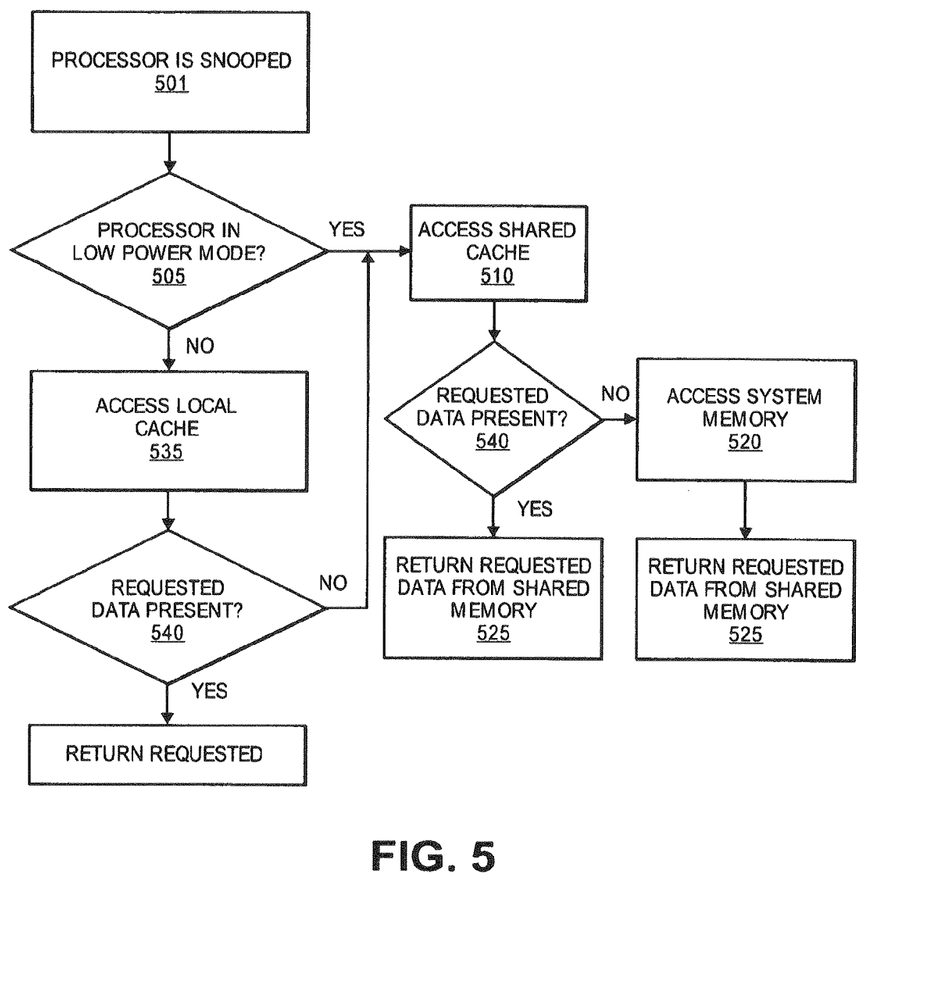
FIG. 5 is a flow diagram of operations that may be used for retaining cached information during a low power mode, according to one embodiment of the invention.

FIG. 5 illustrates a flow diagram of operations that may be used in conjunction with at least one embodiment of the invention, regardless of the processor or system configuration in which the embodiment is used. At operation 501, for example, an access is made to a processor, such as through a snoop operation or other cache access operation. If the accessed processor is in a low power mode, such as a CC3 state, at operation 505, then the processor's shared cache is accessed at operation 510. The access may be a snoop to the shared cache or the snoop may be converted into an another operation to access the shared cache, depending on the protocol used. If the requested information is not present in the shared cache, at operation 515, then an access is made to system memory at operation 520 and the information is returned from the system memory at operation 530, otherwise the information is returned from the shared cache at operation 525.

If the processor was not in a low power mode, such as CC3, at operation 505, then the local cache of the processor is accessed at operation 535. If the information is available in the local cache, at operation 540, then the information is returned from the local cache at operation 545. Otherwise, the process returns to operation 510 to access the information from either the shared cache or system memory as described above. In one embodiment, an accessing processor sends a snoop to other processors in the system regardless of the power state they are in and the accessed processor determines whether to send the access to a local cache or shared cache, based on the power state of the accessed processor. For example, if the accessed processor is in a CC3 state when accessed, a snoop operation from another processor would be redirected to the accessed processor's shared cache either as a snoop or another operation. Otherwise, the snoop operation may result in an access to the accessed processor's local cache if the accessed processor is in a power state that would allow the local cache to be snooped. In other embodiments, a table is maintained, such as through BIOS, that an accessing processor may reference prior to accessing another processor in order to determine whether the local cache of that processor should be accessed or its shared cache should be accessed, based on the power state indicated in the table. In other embodiments, other techniques for managing where an access should be directed based on the power state of an accessed processor may be used.

Embodiments described herein may be implemented in a number of ways using a number of technologies. For example, at least one embodiment is implemented in CMOS logic, whereas other embodiments are implemented in software. Still other embodiments are implemented through a combination of hardware logic and software.

In an embodiment, the software used to facilitate the routine can be embedded onto a machine-readable medium. A machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM) including firmware; random access memory (RAM); magnetic disk storage media; optical storage media; flash memory devices; etc.), as well as electrical, optical, acoustical or other form of propagated signals (e.g., carrier waves, infrared signals, digital signals, etc.); etc.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor.

Thus, a method and apparatus for directing micro-architectural memory region accesses has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD- RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a first core including a first level one cache and a second core including a second level one cache,
the first core to enter a plurality of low power modes, including but not limited to:
a first low power mode, wherein one or more clocks for the first core is to be halted while maintaining power to the first core in response to the first core entering the first low power mode, and
a second low power mode, wherein upon entering the second low power mode data from the first level one cache is to be stored to a level two cache and the first core is powered down while power to other portions of the processor are maintained, and
a third low power mode, wherein upon an entry into the third low power mode, data from the first level one cache is to be stored to a level two cache and the processor, including the first core, is powered down, and
snoop logic included in the first core to receive an access directed to the first core from another agent, the access directed to the first core from the another agent regardless of a power state of the first core, wherein the snoop logic is to redirect the access to the level two cache in response to the first core being in the second or third low power mode and to direct the access to the first level one cache in response to the first core not being in the second or third low power mode.

2. A processor comprising:
a first core coupled to a first level one cache and a second core to be associated with a second level one cache,
the first core to enter a plurality of low power modes, including but not limited to:
a first low power mode, wherein one or more clocks for the first core is to be halted while maintaining one or more power supplies to the first core in response to the first core entering the first low power mode, and
a second low power mode, wherein data from the first level one cache is to be stored to a level two cache and at least the first core is to be powered down upon an entry of the first core to the second low power mode;
storage to hold an indication of a power state for the first core; and
snoop logic of the first core to direct an access to the first core for the data to the first level one cache in response to the indication of the power state for the first core indicating the first low power mode for the first core and to redirect the access to the first core for the data to the level two cache in response to the indication of the power state for the first core indicating the second low power mode for the first core, wherein the access is directed to the first core from another agent regardless of the power state for the first core.

3. The processor of claim 2, wherein the storage to hold the indication of a power state for the first core includes a register, and wherein the access includes a snoop coherency request.

4. The processor of claim 2, wherein at least the first core being powered down to enter the second low power mode comprises removing power from a first portion of the core while maintaining power to a second portion of the core.

5. The processor of claim 2, wherein at least the first core being powered down to enter the second low power mode comprises removing all power from the first core.

6. A multi-core processor comprising:
a shared cache;
a first core coupled to the shared cache, the first core to have a local cache, wherein the first core is to enter a low power mode, and wherein a data from the local cache is to be stored to the shared cache and power for the first core is to be reduced in response to an entry into the low power mode;
a second core coupled to the first core and the shared cache, the second core to generate a request to be associated with the data, the request to be communicated to the first core from the second core regardless of a power state for the first core;
storage to hold an indication of the power state for the first core;
snoop logic of the first core to cause the first core to not receive the request if the first core is in the low power mode, wherein the snoop logic is to direct the request to the local cache or to the shared cache, based on the indication of the power state to be held in the storage; and
system logic integrated with the first core and the second core, the system logic comprising a memory controller, a graphics controller, and an I/O controller.

7. The multi-core processor of claim 6, wherein the snoop logic to determine the first core is in an active power state or the low power state based on the indication of the power state to be held in the storage, and the access to include a snoop coherency request.

8. The multi-core processor of claim 7, wherein the snoop logic is further to cause the first core to receive the request in response to the first core being in the active power state.

9. A system comprising:
a first multi-core processor comprising a first core having a first L1 cache, a second core having a second L1 cache, and a first shared L2 cache, the first core to enter a first low power mode, in which power to the first core is to be reduced and a data from the first L1 cache is to be stored to the first shared L2 cache upon an entry to the first low power mode;
a second multi-core processor comprising a third core having a third L1 cache, a fourth core having a fourth L1 cache, and a second shared L2 cache, the third core to enter a second low power mode, in which one or more clocks to the third core are stopped while maintaining one or more power supplies to the third core; and
a shared bus coupled to the first multi-core processor and the second multi-core processor to communicate requests to access information in the first L1 cache, the second L1 cache, the third L1 cache, the fourth L1 cache, the first shared L2 cache, and the second shared L2 cache,
the first core further comprising a first snoop logic including a memory to store a value, wherein the first snoop logic is to direct a first request sent to the first core from the second multi-core processor to the first L1 cache or to the first shared L2 cache based on the value, wherein the second multi-core processor is to send the first request to the first core regardless of a power state of the first core, and the second multi-core processor further comprising a second snoop logic to cause the third L1 cache of the third core to receive a second request if the third core is in the second low power mode.

10. The system according to claim 9, wherein the first core has a third low power mode, in which one or more clocks to the first core are to be reduced or removed, the first snoop control logic to direct the first request to the first L1 cache if the first core is in the third low power mode.

11. The system according to claim 10, wherein the third core has a fourth low power mode, in which power to the third core is to be reduced or removed and at least modified information stored within the third L1 cache is to be stored in the second shared L2 cache prior to entering the fourth low power mode, the second snoop control logic to direct the second request to the second shared L2 cache if the third core is in the fourth low power mode.

12. The system according to claim 9, further comprising a system memory coupled to the shared bus.

13. A processor comprising:
a first multi-core processor comprising a first core having a first L1 cache, and a second core having a second L1 cache;
a second multi-core processor comprising a third core having a third L1 cache, and a fourth core having a fourth L1 cache;
a third multi-core processor comprising a fifth core having a fifth L1 cache, and a sixth core having a sixth L1 cache;
a fourth multi-core processor comprising a seventh core having a seventh L1 cache, and an eighth core having an eighth L1 cache;
a last level cache coupled to the first, second, third, and fourth multi-core processors;
a memory controller to provide access to a system memory;
a ring interconnect coupled to the first, second, third, and fourth multi-core processors, the last level cache, and the memory controller; and snoop logic of the first core, the snoop logic to receive a request for data directed to the first core from the second multi-core processor, the request directed to the first core from the second multi-core processor regardless of a power mode of the first core, wherein the snoop logic is to redirect the request to a shared cache based at least on the power mode of the first core, the first core to enter a low power mode, in which power to the first core is to be reduced and a data within the first L1 cache is to be stored in the shared cache prior to entering the low power mode.

14. The processor according to claim 13, wherein the shared cache is a level-2 cache.

15. The processor according to claim 13, wherein the shared cache is the last level cache.

16. The processor according to claim 13, wherein the low power mode includes a first low power mode, the first core having a second low power mode, in which one or more clocks to the first core are to be reduced or removed, the snoop logic to direct the request to access information to the first L1 cache if the first core is in the second low power mode.

17. The processor according to claim 13, wherein the snoop logic is to direct the request to the first L1 cache if the first core is active and to redirect the request to the shared cache if the first core is in the low power mode.

18. The processor according to claim 13, wherein the snoop logic is a first snoop control logic and the request to access information is a first request to access information, the processor further comprising a second snoop control logic associated with the third core, the second snoop control logic to direct a second request to access information to the third L1 cache if the third core is active and to direct the second request to a second shared cache if the third core is in the low power mode.

19. The processor of claim 2, wherein the first core is to only store modified data from the first level one cache to the level two cache before entry into the second low power mode.

20. The processor of claim 1, wherein the processor further comprises an integrated graphics controller and an integrated memory controller.

* * * * *

UNITED STATES PATENT AND TRADEMARK OFFICE
CERTIFICATE OF CORRECTION

PATENT NO. : 9,274,592 B2
APPLICATION NO. : 14/141926
DATED : March 1, 2016
INVENTOR(S) : Sanjeev Jahagirdar, Varghese George and Jose Allarey It is certified that error appears in the above-identified patent and that said Letters Patent is hereby corrected as shown below:

In the claims

Column 11, line 13, delete "control";
Column 11, line 20, delete "control".

Signed and Sealed this
Twenty-sixth Day of July, 2016

Michelle K. Lee
*Director of the United States Patent and Trademark Office*